United States Patent [19]
Degawa et al.

[11] Patent Number: 5,980,982
[45] Date of Patent: Nov. 9, 1999

[54] COATED PARTICLES FOR SYNTHESIZING DIAMOND AND PROCESS FOR PRODUCTION OF DIAMOND ABRASIVE FOR SAWING

[75] Inventors: Junji Degawa; Kazuwo Tsuji; Akifumi Fujioka; Yasushi Goda, all of Itami, Japan

[73] Assignee: Sunitomo Electric Industries, Ltd., Osaka, Japan

[21] Appl. No.: 08/629,516

[22] Filed: Apr. 9, 1996

[30] Foreign Application Priority Data

Apr. 13, 1995 [JP] Japan .................................. 7-113784
Feb. 7, 1996 [JP] Japan .................................. 8-046603

[51] Int. Cl.$^6$ ........................................................ B01J 3/06
[52] U.S. Cl. ........................................... 427/185; 423/446
[58] Field of Search ............................... 264/57; 423/446; 427/185, 213; 51/307

[56] References Cited

U.S. PATENT DOCUMENTS

| | | | |
|---|---|---|---|
| 4,547,257 | 10/1985 | Iizuka | 117/79 |
| 4,770,907 | 9/1988 | Kimura | 427/217 |
| 4,927,619 | 5/1990 | Tsuji | 423/446 |
| 5,194,070 | 3/1993 | Sumiya | 51/293 |

FOREIGN PATENT DOCUMENTS 0533443 3/1993 European Pat. Off. .
2242443 10/1991 United Kingdom .

OTHER PUBLICATIONS

Patent Abstracts of Japan 59 164 605, Jan. 18, 1985.
Patent Abstracts of Japan 59 164 607, Jan. 18, 1985.
JP–A–49004630, Feb. 1974
JP–A–47 015 386, Aug. 22, 1972.

*Primary Examiner*—Steven Bos
*Assistant Examiner*—Stuart L. Hendickson
*Attorney, Agent, or Firm*—Smith, Gambrell & Russell, LLP; Beveridge, DeGrandi, Weilacher & Young Intellectual Property Group

[57] ABSTRACT

A coated particle for synthesizing diamond includes: a single crystal of a fine diamond particle coated with at least one layer which contains at least one kind of solvent metal powder for synthesizing diamond and/or at least one kind of solvent metal powder with organic bonding material. Diamond abrasive particles for sawing are produced by a process which includes the steps of: coating fine diamond particles with at least one layer which contains at least one kind of solvent metal powder for synthesizing diamond and/or at least one kind of solvent metal powder with organic bonding material, filling a molding with the coated fine diamond particles, compacting, arranging a compact in a synthesizing vessel, heating the compact to a temperature above a solvent metal-graphite melting point under a pressure condition in which diamond is thermodynamically stable, and recovering the diamond abrasive particles.

13 Claims, 8 Drawing Sheets

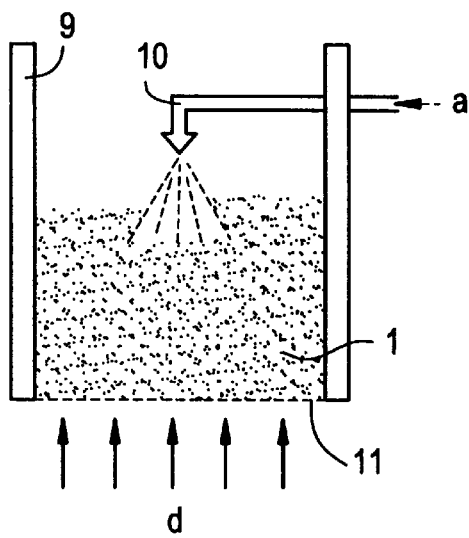
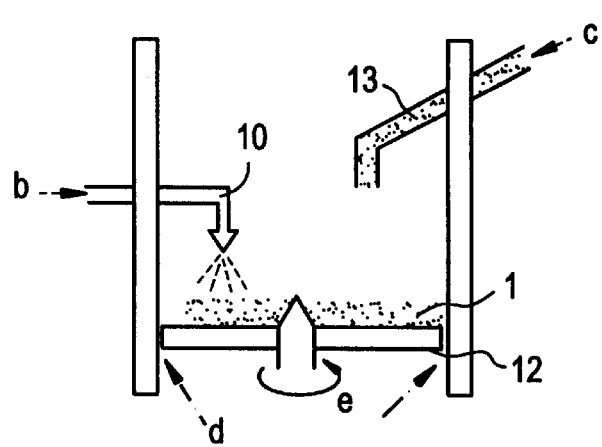
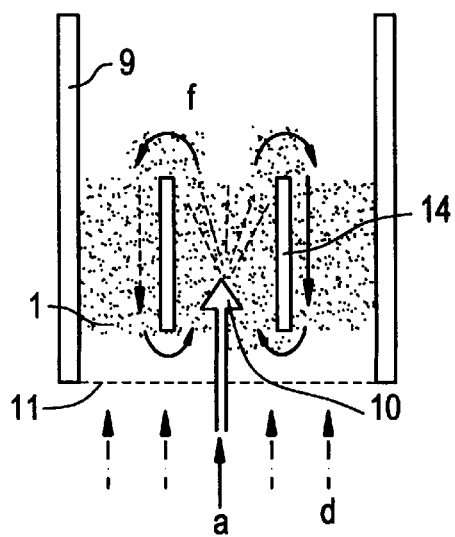
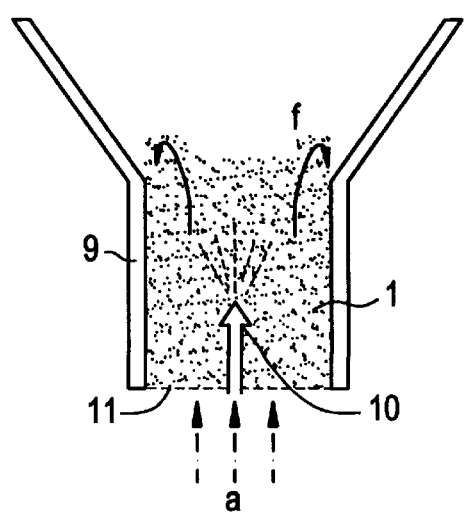

COATED PARTICLES FOR SYNTHESIZING DIAMOND AND PROCESS FOR PRODUCTION OF DIAMOND ABRASIVE FOR SAWING

BACKGROUND OF THE INVENTION (1) Field of the Invention

The present invention relates to a single crystal diamond particle having 20~60 U.S. mesh (hereafter "mesh" means U.S. mesh) and the method of making the diamond particle. The diamond particle is used as an abrasive for sawing, especially to cut stone, concrete, and asphalt.

(2) Description of the Prior Art

Because stone, concrete, and asphalt are hard and brittle materials, diamond particles, which are used as an abrasive for sawing to cut the above materials, must be of high-strength and not friable. There is a strong mutual relationship between cutting performance (tool life) and particle strength. Moreover, it is well known that the particle strength depends on the perfection and symmetry of the diamond particle shape.

When there is a lack portion 29 (e.g., a broken portion or a portion not completely grown) at the surface of a diamond particle 28, as shown in FIG. 11A, the strength of the particle decreases depending on the extent of the lack portion. FIG. 11B shows a long and narrow diamond particle 30 and a sharp-edged diamond particle 30. Such diamond particles have low strength due to lack of symmetry. A high-strength diamond particle is required to have no or minimal lack portion and good symmetry.

The environment for growing diamond can cause a lack portion or poor symmetry of the grown diamond product. When growing diamonds have insufficient distance around them, the growing diamonds contact each other or are unnaturally restricted, even though not contacting, by supply of raw material and the surroundings. For these reasons, many synthesized diamond particles have lack portion(s) and bad symmetry. Therefore, it is necessary to have sufficient distance between growing diamonds to synthesize high-strength diamonds.

However, providing sufficient distance is contrary to economical demands, which require manufacturers to grow as many diamond particles as possible in a limited-space diamond synthesizing vessel. It is required industrially to grow diamonds as densely together as possible, maintaining the lowest necessary distance between the grown particles.

There are generally two methods of synthesizing a diamond particle, which methods are described below.

The first method, as shown in FIG. 12A, is that a compact ("compact" is defined as a powder or particle compacted in a die or mold), including a mixture of non-diamond carbon powder raw material (usually graphite and hereafter referred to as "raw carbon") and solvent metal powder (usually a combination of Fe, Co, Ni, Cr, and Mn and hereafter referred to as "solvent metal"), for diamond synthesizing is maintained at a thermodynamically stable region for diamond and above the melting point temperature of metal-graphite (usually 5~6 GPa and 1300~1600° C.). (This method is hereafter referred to as the "powder method.")

The second method, as shown in FIG. 12B, is that a multilayer arrangement of raw carbon plates 7 and solvent metal plates 6 is maintained at a thermodynamically stable region for diamond and over the melting point temperature of metal-graphite, the same as in the powder method. (This method is hereafter referred to as the "multilayer method.")

Comparing these two methods, it is thought that the powder method is superior to the multilayer method in terms of yield since the three-dimensional space of the synthesizing vessel is effectively used, and the multilayer method is superior to the powder method in terms of strength of the resulting diamond particles since interference between synthesized diamond particles is limited in one plane.

For effective manufacturing of intended particle size diamond in these two methods, fine single-crystal diamond particles are dispersed as seed crystals in the mixture or in the solvent metal plate. In this case, diamond particles are synthesized around the seed crystals.

In these manufacturing procedures, the diamond particles are synthesized to larger than the intended particle size, and moreover, many produced diamond particles have lack portions and poor symmetry because of interference at the densely arranged portion.

The multilayer method is proposed and practically used in that the seed crystals 1 are arranged regularly in the solvent metal plate 6 as shown in FIG. 13 to resolve the issue (see, for example, Tokko-shou 63-57099, corresponding to U.S. Pat. No. 4,547,257, and Tokkai-hei 5-23574, corresponding to U.S. Pat No. 5,194,070). This method results in a higher-strength product and a higher yield ratio of the intended diamond particle size than previous techniques. The seed crystals are arranged ideally in a plane, but the yield is insufficient since there is un-used space in the vertical direction.

The seed crystals are isolated by only the liquid phase of the solvent metal under the synthesizing conditions of the diamond, and therefore, the arrangement sometimes results in rough and dense portions of diamonds because of movement of the seed crystals.

SUMMARY OF THE INVENTION

It is, therefore, an object of the present invention to provide a particle for synthesizing a diamond, comprising a single crystal of a fine diamond particle coated with at least one layer which contains at least one kind of solvent metal powder for synthesizing diamonds and/or at least one kind of solvent metal powder with an organic bonding material.

It is preferable that the layer include non-diamond carbon.

It is preferable to use an acrylic copolymer as the organic bonding material.

The object of the present invention is achieved by a process for the production of a diamond abrasive for sawing, comprising the following steps: coating fine diamond particles with at least one layer which contains at least one kind of solvent metal powder for synthesizing diamond and/or at least one kind of solvent metal powder with an organic bonding material, filling a mold with the coated fine diamond particles, compacting, arranging the resulting compact in a synthesizing vessel, heating the compact to a temperature above a solvent metal-graphite melting point under a pressure condition at which diamond is thermodynamically stable, and recovering the resulting diamond abrasive particles. It is preferable to coat the fine diamond particles by a spraying method, especially in a Wurster type fluidized bed or horizontally rotating disk equipment.

BRIEF DESCRIPTION OF THE DRAWINGS

FIG. 6A is a schematic showing a method of coating with sprayed powder in a fluidized bed.

FIG. 6B is a schematic showing a method of coating with sprayed powder on a horizontally rotating disk.

FIG. 7A is a schematic showing a Wurster type fluidized bed with an inner cylinder.

FIG. 7B is a schematic showing a Wurster type fluidized bed with a broader portion at its upper part.

DETAILED DESCRIPTION OF THE INVENTION

The present inventors have considered the above issues, and have focused on the method of using compacted raw material, which is made from fine seed crystal (fine single crystal diamond) coated with sufficient amounts of raw carbon powder and solvent metal powder. "Sufficient amount" means that the coated seed crystals are large enough so that the grown diamond particles do not contact each other. Therefore, it is fundamentally required that the coated seed crystals are larger than the intended synthesized diamond particles.

Further study on the following is required for practical use:
(1) Pores in the Coated Seed Crystals
  When the coated crystals are compacted, the pores in the coated crystals are broken, and the distance between the seed crystals decreases.
(2) Open Space Among the Seed Crystals in a Mold or a Die
  When the coated seed crystals are compacted in a mold or die, the open space among the seed crystals decreases.
(3) Non-Uniform Compaction
  Distance between each seed crystal decreases in only one specific direction in some methods of compaction.
(4) Pores Remaining in a Compact
  Since the pores are broken under the conditions for synthesizing diamond, the distance between the seed crystals decreases.
(5) The Volume of Raw Carbon Decreases when the Raw Carbon Changes to a Diamond Structure.
  Therefore, the Size of the Coated Seed Crystal is Far Larger than the Intended Synthesized Diamond Particle Size.

After many experiments on practical manufacturing methods for producing coated seed crystals, the present inventors have invented this method to coat the seed crystals with raw carbon powder and solvent metal powder.

According to the present invention:
  (1) The distance between the seed crystals can be controlled by the thickness of the coated layer (size of coated seed crystals), the pore ratio in the coated layer, and the selection of compaction methods.
  (2) The yield amount of diamond increases since the compact of coated seed crystals can use the synthesizing vessel three-dimensionally and effectively.
  (3) Each seed crystal does not move since each seed crystal is isolated by a solid material containing raw carbon under the conditions for synthesizing diamond.

Figure 1A:
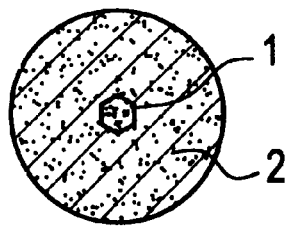
FIG. 1A shows a schematic cross section of a coated diamond particle used in the Examples.
Figure 1B:
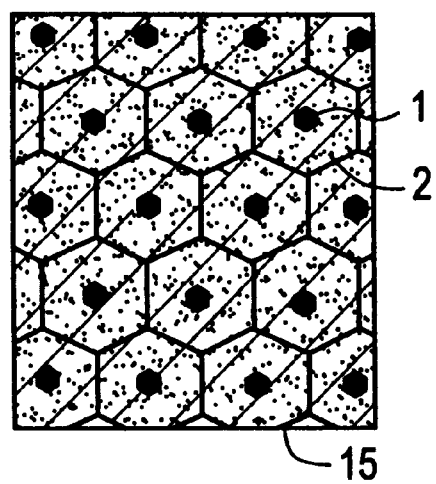
FIG. 1B shows a schematic cross section of a compact used in the Examples.
Figure 2A:
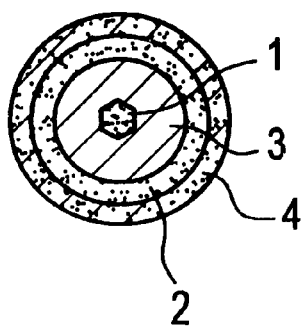
FIGS. 2A and B show schematic cross sections of other coated particle and compact embodiments of this invention.
Figure 2B:
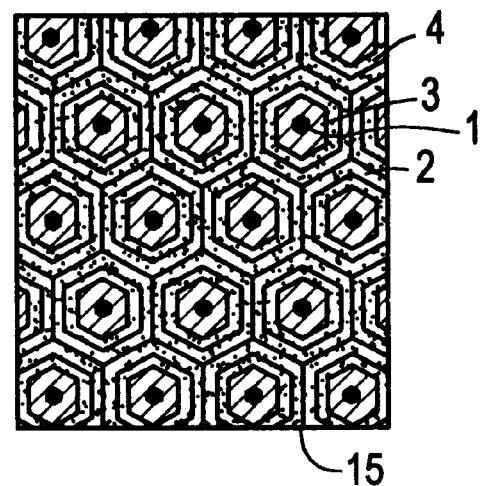

Therefore, this invention remarkably improves the yield amount and strength of diamond compared with the prior art. The most fundamental constitution of this invention is comprised of using a compact 15, as shown in FIG. 1B, of fine seed crystals 1 coated with a mixture of raw carbon powder and solvent metal powder, as shown in FIG. 1A. The same results can be obtained by using the compact 15, as shown in FIG. 2B, of fine seed crystals 1 coated with a solvent metal layer 3, a mixture layer 2, and a carbon layer 4, as shown in FIG. 2A. It is essential that the coated layer includes raw carbon and solvent metal. Using solely raw carbon is not preferable for the innermost layer, because the seed crystals grow large with the change from carbon to diamond, namely through solvent metal. The second and outer layers are optionally selected. For example, multilayer coated seed crystals, such as seed crystal/solvent metal/raw carbon/solvent metal/raw carbon, or seed crystal/solvent metal/mixture of raw carbon and solvent metal/raw carbon, can also be used. Moreover, each layer can be changed to different mixture ratios of raw carbon and solvent metal and different kinds of solvent metals.

Figure 3:
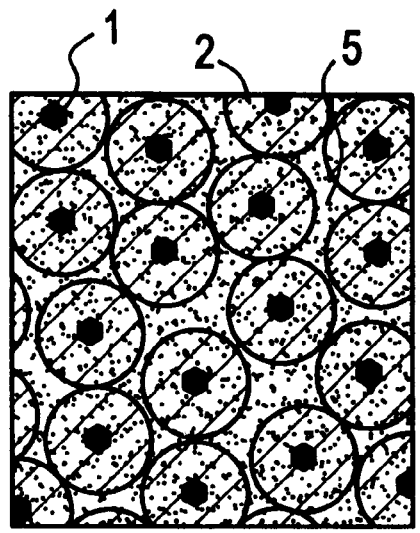
FIG. 3 shows a schematic cross section of another embodiment of a compact used for synthesizing diamond.

Also, the compacted mixture of these coated crystals, raw carbon powder, and/or solvent metal powder, is industrially available. It is possible to decrease the amount of the coated material as much as the mixed amount of the raw carbon powder and/or the solvent metal powder. But it is indispensable in this method, as shown in FIG. 3, that there are contacting and not contacting areas between the coated particles depending on the condition of the added powder 5. Distances between the seed crystals vary in proportion to the added powder. When too much powder is added (the coated amount is too little), there is little improvement compared with the powder method. In assessing the advantage of the present invention, therefore, the true volume of the coated particles (the amount of seed crystals, raw carbon, and solvent metal excluding pore and organic bonding material) must be at least 20 volume percent. When the mixed powder includes raw carbon in this method, it is not necessary to include raw carbon in the coated particles.

The thickness and composition of the coated layer and the amount and composition of the mixed powder are determined by considering the intended diamond particle size, the distance between seed crystals, the amount of raw carbon and solvent metal, the compaction method, and deformation of the compact at synthesizing conditions of diamond in all of the above methods. The seed crystals, raw carbon, and solvent metal which are used in the present invention are the same as those used in the prior techniques. The seed crystal is usually in the range of 10~200 μm diameter since large seed crystals are liable to contain inclusions (impurities). Moreover, the seed crystal is preferably very fine because it handles easily. When a seed crystal is too small, it is difficult to handle. But, the seed crystal should be a single crystal. Any usual graphite can be used as the raw carbon. The combination of Fe, Co, Ni, Cr, and Mn (each material, alloy or mixture), which are used in the prior techniques, can also be used as the solvent metal in the process of this invention.

The invented producing methods, which are explained in detail hereafter, relate to producing coated particles and compacts from the coated particle.

The methods of producing the coated particles are explained first. To obtain an advantage from this invention, fundamentally any method can be used, provided that each seed crystal is coated uniformly. Various coating methods, such as a plating method, a chemical vapor deposition method, a coating with sprayed powder method, a mechanical alloying method, etc., are considered for use in this invention.

However, there are disadvantages in the chemical reaction methods such as the plating method and the chemical vapor deposition method, because the raw materials are expensive and there are difficulties in thick coating and in the coating mixture with raw carbon. Therefore, there are advantages in the coating powder methods, such as the coating with sprayed powder method and the mechanical alloying method, because there are not the drawbacks of the chemical reaction methods.

Organic bonding materials can be used in the coating with powder methods, and these organic bonding materials can be removed easily by heat treatment after the coating. Moreover, it is sometimes preferable that an overabundance of organic bonding material be intentionally added, to adjust the ratio of distance between the seed crystals in the compact, as described later.

According to the many experiments that were carried out by the present inventors, the coated with sprayed powder method was the simplest, easiest, and most cost-efficient method. This method has been widely used in the field of producing pharmaceuticals and foods. This method is carried out by spraying the mixture of solvent metal powder, raw carbon powder, organic bonding material, and organic solvent from a spraying nozzle 10 to the fine single crystal diamonds 1 or semi-coated single crystal diamonds (hereafter defined as a "core particle") as shown in FIG. 6A in which a core particle is fluidized, or as shown in FIG. 6B in which a core particle is stirred. In the figures, reference number 9 is the outer cylinder of the coating equipment, 11 is a porous plate, 12 is a horizontally rotating disk, 13 is a supply tube for the powder, (a) is a flow of slurry which contains the powder to be coated/organic bonding material/ organic solvent, (b) is a flow of organic bonding material/ organic solvent, (c) is a flow of powder to be coated, (d) is a flow of gas to dry the coated powder, and (e) shows a rotating direction of the horizontally rotating disk 12.

There are many spraying methods, for example:

(1) spraying the slurry of the three components, (2) respectively spraying the coating powder and the organic bonding material dissolved in organic solvent, (3) spraying in the sequence of: organic solvent→organic bonding material→powder to be coated.

All of these methods are applicable. Usually it is desired to achieve the most uniform mixing and, therefore, the most effective method is that where the three components are mixed before spraying. In this case, it is preferable for practical use that the slurry of the mixture be sprayed by side gas from the same nozzle as the mixture. Acrylic copolymer is preferable in terms of high bonding strength, ease of removal by heat treatment, and no remainder after the removal. Other organic bonding materials are also applicable, provided they are removable. It is possible for materials at compression (such as plasticizer and lubricant) and materials to increase the pore ratio in the coated particle, to be added to the organic bonding materials in spite of the fact that these materials make no contribution to bonding strength, provided that these materials are removable. These organic materials are also described under the term "organic bonding material" in this invention. An organic solvent is required to be capable of dissolving the organic bonding materials, dryability, and security. is Lower alcohols, such as ethyl alcohol and iso-propanol (2-propanohol), are preferable when acrylic copolymer is used as the organic bonding material. Inert gases, such as nitrogen and argon, are preferable as drying gas, but air is available. However, moisture in the air must. be excluded since the solvent metal is sometimes oxidized by the moisture.

In the coated-with-sprayed-powder method, all of the supplied powder does not adhere to the core particles. The adherent ratio of the supplied powder sometimes depends on the kind and particle size of the powder. For example, a supplied mixture of 80:20 (weight ratio) of Ni:graphite became a composition of 75:25 (weight ratio) in the coated layer. It is necessary to investigate the adherent ratio and the composition of the coated layer prior to the experiments. Particle diameter of the powder is preferably smaller than ⅒ of a core particle diameter. It is usual that the smaller the diameter and the lighter the weight of the powder, the better adherence of the powder to the core particle.

The most preferable method includes using a Wurster type fluidizing bed in the coated with sprayed powder method. The seed crystals are cohered in other methods. That is, coated particles randomly contain more than one seed crystal and such particles must be removed. On the other hand, such particles are seldom found when a Wurster type fluidizing bed is used. Since the Wurster type fluidizing bed has an inner cylinder 14 as shown in FIG. 7A, or has a broader portion at its upper part as shown in FIG. 7B, the particle decreases velocity at the upper part and falls down along the outer cylinder 9. As the particles flow out in one direction and regularly circulate, cohesion rarely occurs. In these figures, (a) is the flow of slurry which contains powder to be coated/organic bonding material/organic solvent, (d) is the flow of drying gas, and (f) is the flow of core particles.

Next the methods of producing compacts are explained.

Before going in to detail, the organic bonding material must necessarily be removed by heat treatment before or after compaction. Especially when the organic bonding material is included excessively, most of it should be removed before compaction. When it is removed after compaction, the filled amount in the diamond synthesizing vessel decreases since a pore remains in the compact. The removal temperature depends on the kind of organic bonding material and is about 300~600° C. Of course, the heat treatment should be carried out in a reducing or an inert atmosphere in order to prevent oxidation.

Since a small amount of organic lubricant contributes to high density of a compact at compaction, and, therefore, it is advisable that an organic bonding material include an amount of organic lubricant having a removing temperature higher than the organic bonding material. In this case, most of the organic material is removed at a comparatively low temperature, compacting is conducted, and then a small amount of the remainder (organic lubricant) is removed at a comparatively high temperature. Using the mixture of acrylic copolymer whose removing temperature is about 400° C. and a small amount of organic lubricant whose removing temperature is about 500~600° C., the density of the compact increases after the processes of heat treatment at 400° C. and compacting and then heat treatment at 600° C. In order to increase the strength of the compact, treatment at higher than 600° C. is considered. A reducing atmosphere is suggested since solvent metal is reduced.

It is important at compaction molding that all directions of distances between the synthesized diamond particles remain as uniform as possible at the end of synthesizing.

When the direction of the distances differs from other directions, the shortest distance should be of adequate distance to assure that the produced diamond particles do not disturb each other. Therefore, the number of filled seed crystals decreases, resulting in a decrease in yield of diamond. Since this phenomenon relates to the ultra-high pressure apparatus, properties of each apparatus are explained hereafter respectively.

Figure 10A:
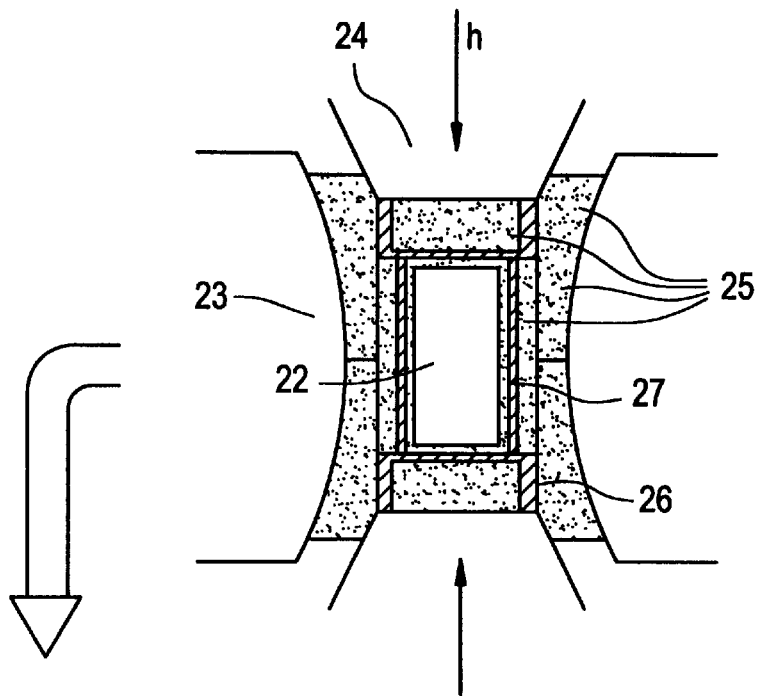
FIG. 10A is a schematic showing a one-axis type ultra-high pressure apparatus for synthesizing diamond.

The first apparatus, a one-axis ultra-high pressure apparatus, is explained with reference to FIG. 10A, which is used widely in industry. The synthesizing vessel of this apparatus is usually a circular column, so a compact is basically molded into a circular column. Considering the most general compaction molding in the direction of the circular column axis using a metal die, the distance between seed crystals is the same as the size of a coated particle in the radial direction, but it decreases in proportion to the compacted length in the axial direction. Furthermore, the following phenomena occur in the ultra-high pressure apparatus:

(1) Since synthesizing space spreads in the radial direction and lessens in proportion to the spread in the axial direction, the distance between the seed crystals increases in the radial direction and shrinks in the axial direction.

(2) There is no pore under the ultra-high pressure condition. Volume of a compact decreases in proportion to the remaining pore in the compact; the decrease causes a shortening of distance between seed crystals in the axial direction.

(3) Volume of raw carbon decreases accompanied by the transformation of non-diamond carbon to diamond; this decrease also causes a shortening of distance between seed crystals in the axial direction.

Figure 4:
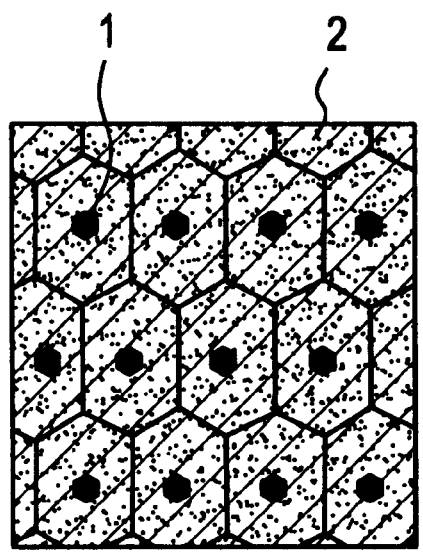
FIG. 4 shows another embodiment of a compact.
Figure 8A:
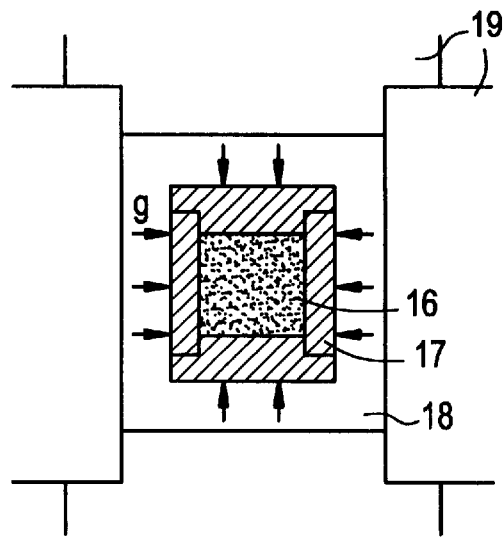
FIG. 8A is a schematic showing a wet-cold-isostatic-press.
Figure 8B:
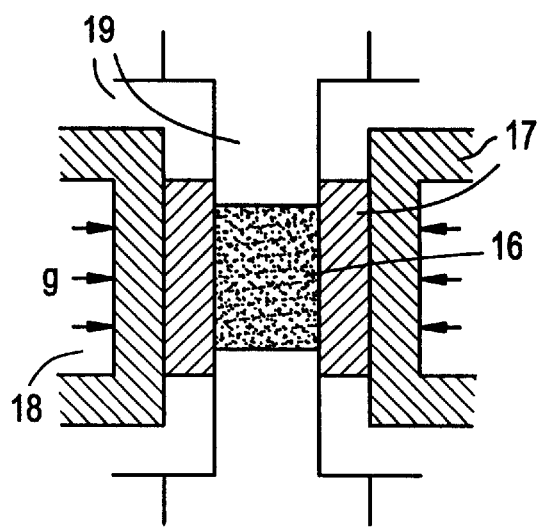
FIG. 8B is a schematic showing a dry-cold-isostatic-press.
Figure 9A:
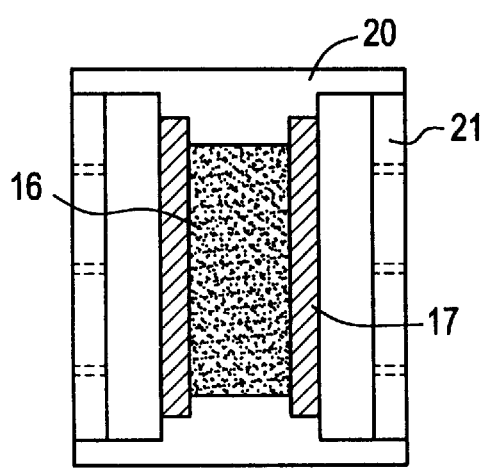
FIG. 9A is a schematic showing an example of a supporting case.

It is, therefore, found in the arrangement of the compact that the distance between the seed crystals in the radial direction is relatively shorter than in the axial direction, as shown in FIG. 4. The present inventors have succeeded in using a dry-cold-isostatic-press apparatus or a method of pseudo-dry-cold-isostatic-pressing with a wet-cold-isostatic-press apparatus. The compact is uniformly compacted from all directions, as shown in FIG. 8A, in normal use of a wet-cold-isostatic-press apparatus, which is widely used as an apparatus for cold-isostatic-pressing. On the other hand, the compact is pressed only from the radial direction with a dry-cold-isostatic-press apparatus as shown in FIG. 8B. When the wet-cold-isostatic-press apparatus is used with a supporting case having side holes that controls pressing in the axial direction by side pores, as shown in FIG. 9A, the apparatus has the same properties as the dry-cold-isostatic-press apparatus (this is defined as "pseudo-dry-cold-isostatic-press").

Compaction ratio in a radial direction and an axial direction, namely, a distance ratio of the seed crystal, can be controlled by the pore ratio in a coated particle and the filled ratio in a compaction mold. The pore ratio has an especially important role on the compaction ratio and can be controlled by the amount of organic bonding material as mentioned before. The volume of organic bonding material is considered to be pore in the coated particles when the coated particles are dewaxed before compaction. It is carried out by increasing the amount of organic bonding material that is intended for compaction in the radial direction. In many cases, adequate distance ratio of the seed crystal can be obtained by controlling the size and pore ratio of coated particles and by using the dry or pseudo-dry-cold-isostatic-press.

It is sometimes necessary to compact a little in the axial direction. In this case, the following methods can be used.

(1) Using a dry-cold-isostatic-press apparatus which has the ability to compact and control in the axial direction.

Figure 9B:
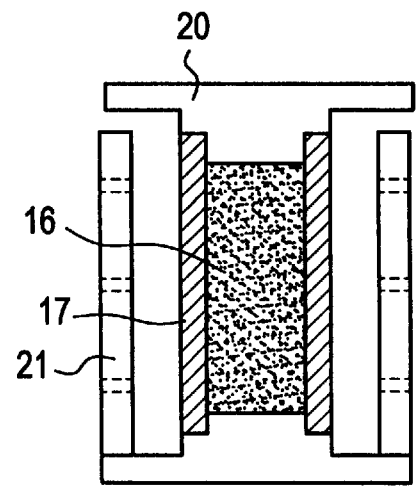
FIG. 9B is a schematic showing another example of a supporting case.

(2) Using a pseudo-dry-cold-isostatic-press apparatus with a supporting case in which a compact is compacted a little in the axial direction, as shown in FIG. 9B.

(3) Before or after compaction of coated particles using a dry cold-isostatic-press, the coated particle is compacted in the axial direction using a metal die or a wet-cold-isostatic-press apparatus.

Figure 10B:
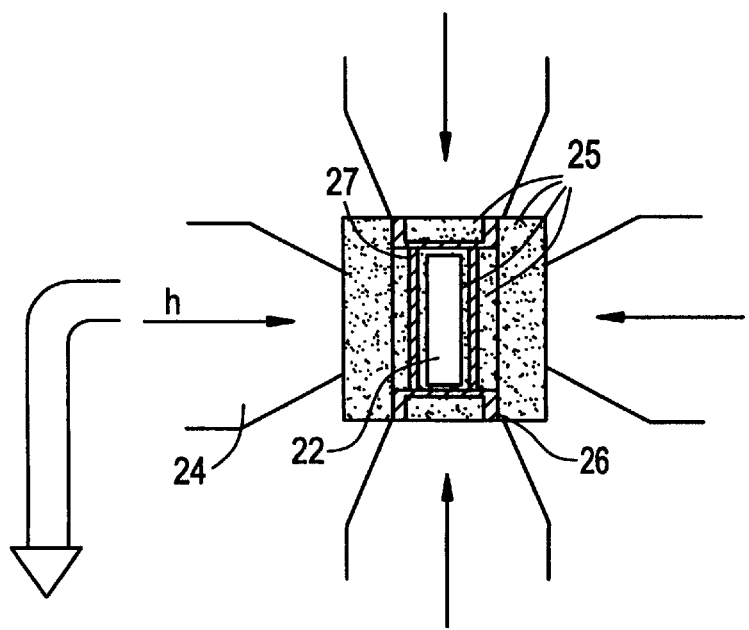
FIG. 10B is a schematic showing a multi-axes type of ultra-high pressure apparatus for synthesizing diamond.
Figure 11A:
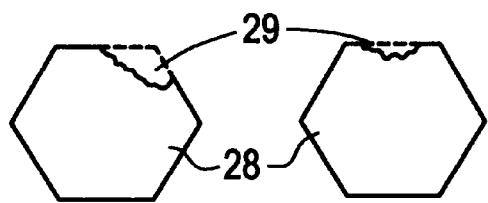
FIG. 11A is a schematic showing diamond particles having a lack portion.
Figure 11B:
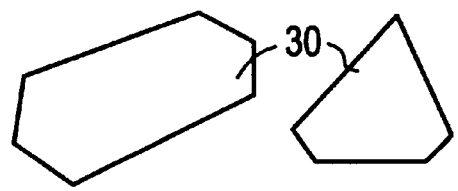
FIG. 11B is a schematic showing diamond particles having poor symmetry.
Figure 12A:
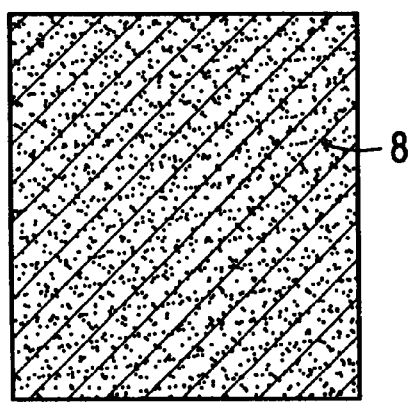
FIGS. 12A and B show prior art arrangements of the powder method and the multilayer method in synthesizing vessels.
Figure 12B:
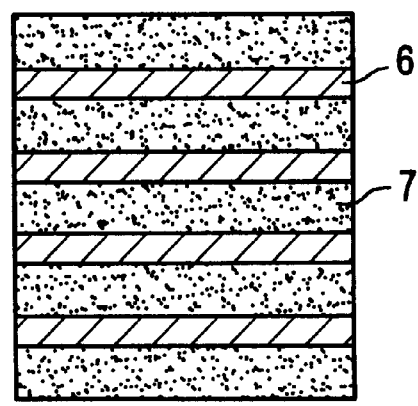
Figure 13:
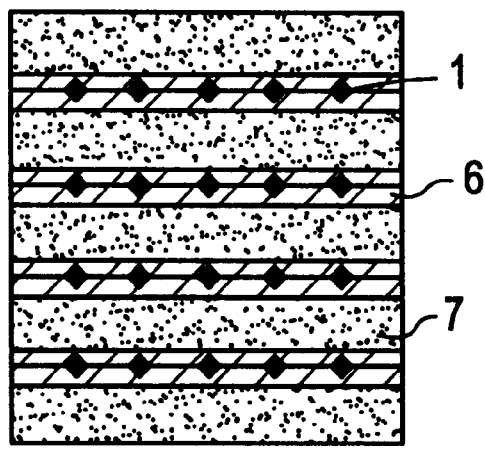
FIG. 13 shows another prior art arrangement in synthesizing vessels, namely, regularly arranged seed crystals in a multilayer arrangement.

In the next case, a multi-axes ultra-high-pressure apparatus is used as shown in FIG. 10B, wherein a compact is shrunk almost uniformly from all directions. In this instance, it is preferable that the distance between seed crystals in the compact be uniform. Such compact can be obtained easily by using a wet-cold-isostatic-press apparatus.

In FIGS. 8, 9, and 10, reference number 16 stands for particles to be compacted, 17 stands for a rubber molding, 18 stands for a liquid pressure medium, 19 stands for a steel vessel, 20 stands for a metal lid, 21 stands for a supporting case, 22 stands for a diamond synthesizing vessel, 23 stands for a die made of cemented carbide, 24 stands for an anvil made of cemented carbide, 25 stands for a ceramic pressure medium, 26 stands for electro conductive parts, and 27 stands for a graphite heater. Reference letter (g) stands for a compacting direction in a cold-isostatic-press apparatus and (h) stands for a compacting direction in an ultra high-pressure apparatus.

Using only the compact 15, which is obtained by the above methods, high strength diamond particles can be effectively synthesized with any prior method or the new method.

Figure 5A:
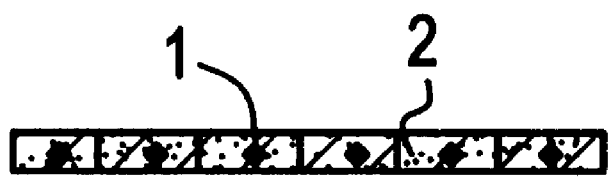
FIG. 5A shows a schematic cross section of a compact in which coated particles are compacted in a mono-layer.
Figure 5B:
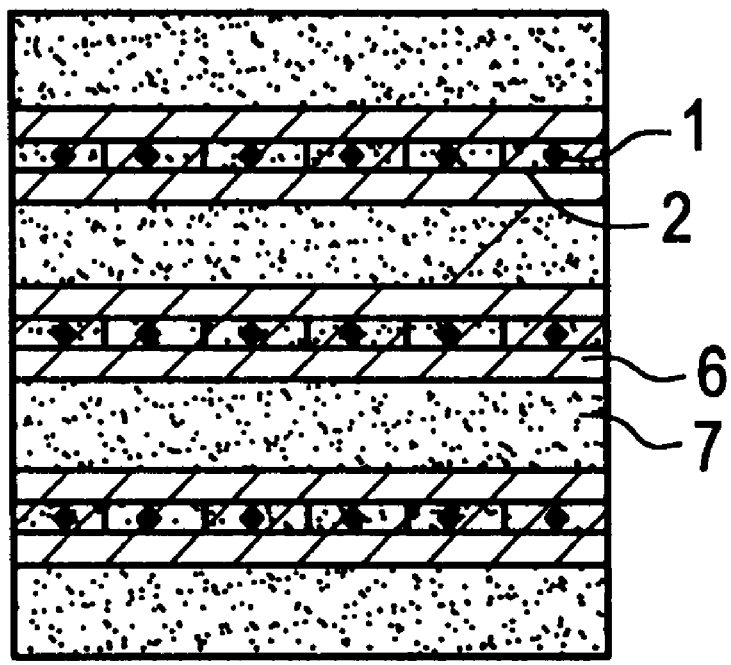
FIG. 5B shows a schematic cross section of the mono-layer compact stacked with other fillers in a synthesizing vessel.

The multilayer method can be applicable to synthesize diamond particles using these coated particles. In other words, the method uses a single layer compact of coated particles with a raw carbon plate and a solvent metal plate as shown in FIG. 5A. There is no advantage in stacking only the single layer compact compared with using a circular column compact. The single layer compact is preferably combined with raw carbon and/or solvent metal layers, as shown in FIG. 5B. In this case, the distance between the seed crystals in the thickness direction is kept and controlled by the plate of raw carbon 7 and/or solvent metal 6. Therefore, the amount of coated raw carbon and solvent metal should be maintained to have sufficient distance between seed crystals in the single layer. It is preferable and simplest to make a single layer compact with a metal die. When compacting the coated particles, the following method is suggested in handling the single layer compact. The plate of raw carbon or solvent metal is coated with organic adhesive, the coated particles are arranged and adhered to the plate, and then the combination is compacted as it is. The organic adhesive and organic bonding material should be removed by heat treatment prior to synthesizing diamond.

Comparing with the conventional multilayer method, especially seed crystals arranged orderly in a layer, this invention is advantageous in that the seed crystals do not move under even the diamond synthesizing conditions, because each seed crystal is surrounded by solid raw carbon. The synthesized diamond particles have remarkable strength compared with those produced by the conventional method. Since the amount of yield is the same as in the conventional multilayer method, it is suggested that the above invented compact be used in the multilayer method. Such method, therefore, has high industrial applicability because the coating amount can decrease, a small amount of coated diamond particles is used, and an isostatic-press apparatus is not needed.

As explained above, diamond produced using the invented coated particle has a small lack portion, good symmetry, and high strength. Therefore, the diamond is applicable to not only abrasive sawing, but also to a diamond wheel and a dresser.

The method of producing the coated particle is preferable to industrial use, because the composition, particle size, and pore ratio of a coated layer are controlled depending upon the selected fine diamond particle and powder to be coated.

It is possible to synthesize a diamond by only putting the coated particle or the mixture of the coated particle and other raw materials into the diamond synthesizing vessel in an ultra-high pressure apparatus. However, when the coated particles or the mixture of the coated particles and other raw materials are compacted previously and then synthesized to diamond, the amount of diamond yield and quality are remarkably improved.

EXAMPLE 1.

Single crystal diamond particles having the size of 325/400 mesh were coated with sprayed slurry which consisted of raw carbon/solvent metal/organic bonding material/organic solvent, using the apparatus shown in FIG. 7A. The raw carbon was graphite powder, the solvent metal had the composition of Fe:Ni=58:42 (weight ratio), the organic bonding materials were acrylic copolymer and polyethylene glycol, and the organic solvent was isopropanol. The mixed ratio was (graphite):(Fe-Ni alloy):(acrylic copolymer): (polyethylene glycol):(isopropanol)=25:75:7.5:7.5:125 (by weight ratio). Heated air at 80° C. was used as the drying gas. Measuring the diameter of the coated particles which were intermittently picked out from the apparatus, the coating was stopped when the coated particles became about 800 $\mu$m diameter. The coated layer had the composition of (graphite):(Fe-Ni alloy)=28:72 (weight ratio). Coated particles having a 750~810 $\mu$m diameter were obtained by sieving, and the organic bonding material was removed in a hydrogen stream at 450° C. for 60 minutes. The particles were compacted into a circular column under a pressure of 3000 kgf/cm$^2$ (294 MPa), applying the case as shown in FIG. 9A to the apparatus of FIG. 8A. The circular column compact was cut and pressed in a metal die under a pressure of 6000 kgf/cm$^2$ (588 MPa) in the axial direction and then heated in a hydrogen stream at 1000° C. for 60 minutes. The apparent density of the compact was 85% of the theoretical density. The compact was worked into a circular column of 25 mm diameter and 20 mm height, and then the circular column was put into a one-axis ultra-high pressure apparatus as shown in FIG. 10A. The compact was exposed to the conditions of 5.3 GPa and 1350° C. for 30 minutes, and diamond particles were obtained.

The yielded amount of diamond particles was 7.6 grams, and 5.2 grams out of 7.2 grams had a size of 40/50 mesh. 4.4 grams out of this 5.2 grams had no lack portion, good symmetry, and high strength. The method of measuring strength and comparative examples are summarized after the examples.

EXAMPLE 2

Single crystal diamond particles having the size of 230/270 mesh were coated with raw carbon/solvent metal using the apparatus shown in FIG. 6B. Drying gas stirred the particles to a certain extent, because the horizontal rotating disk 12 was a porous plate. The mixture of raw carbon powder/solvent metal powder and organic solvent dissolving the organic bonding material were alternately sprayed from nozzles 10 and 13. The raw carbon was graphite powder and the solvent metal was a mixture of Fe powder and Co powder. The composition of the mixture was (graphite):Fe:Co=40:30:30 (weight ratio). Organic bonding materials were acrylic copolymer and ethyl cellulose, and the organic solvent was ethanol. Acrylic copolymer and ethyl cellulose in the ethanol was 10 wt. % and 2 wt. %, respectively. Nitrogen gas at 50° C. was used as the drying gas.

Measuring the diameter of coated particles which were intermittently extracted from the apparatus, the coating was stopped when the coated particles became about 1000 $\mu$m. Coated particles having a 960~1060 $\mu$m diameter were heated to remove the organic bonding material as described in Example 1, and then the coated particles were compacted into a circular column compact under a pressure of 4000 kgf/cm$^2$ (392 MPa) using the method shown in FIG. 9A. This compact was heated and worked as described in Example 1. The apparent density of the compact was 87% of the theoretical density.

The compact was exposed for 45 minutes using the same apparatus under the same conditions as Example 1. The amount of yielded diamond was 6.4 grams, and 4.2 grams out of this 6.4 grams had a size of 30/40 mesh. 3.2 grams of these particles were high strength diamond.

EXAMPLE 3

Single crystal diamond particles having the size of 325/400 mesh were coated using the same apparatus and the same method as described in Example 1. In this Example, the composition of the slurry was (graphite):(Fe-Ni alloy): (acrylic copolymer):(polyethylene glycol):(isopropanol)= 5:95:5:5:75 (weight ratio). After the particles were coated aiming at a 600 $\mu$m diameter, particles having 540~600 $\mu$m in diameter were selected. These particles were heated at 400° C. for 30 minutes in a hydrogen stream to remove the organic bonding material, and then mixed with graphite powder. The mixture ratio was (coated particles):(graphite powder)=70:30 (weight ratio)=39:61 (volume ratio). A compact was obtained in the same manner as described in Example 2, and the apparent density of the compact after heat treatment and working was 89% of its theoretical density. Diamond was synthesized in the same manner as described in Example 1, and the amount of yielded diamond was 7.8 grams, and 4.8 grams out of this 7.8 grams had a size of 40/50 mesh. 3.4 grams of these particles were high strength diamond.

EXAMPLE 4

Single crystal diamond particles having the size of 140/170 mesh were plated with Co by electroless plating, and grew to about 150 μm in diameter. The coated particles were further coated with only carbon powder in the same manner as described in Example 2 so that the coated composition became Co:graphite=75:25 (weight ratio). After the coated particles were compacted into a circular column compact under a pressure of 3000 kgf/cm$^2$ (294 MPa) applying the case as shown in FIG. 9A to the apparatus of FIG. 8A, the compact was heated at 1050° C. in a hydrogen stream for 30 minutes. The apparent density of the compact was 82% of its theoretical density. The compact was worked into the same size circular column as in Example 1 and exposed to the conditions as described in Example 1 for 15 minutes. The amount of yielded diamond was 7.3 grams, 5.4 grams out of this 7.3 grams had a size of 50/60 mesh, and 4.8 grams out of this 5.4 grams were high-strength diamond particles.

EXAMPLE 5

Coated particles were produced as described in Example 1. The coating was stopped at a little smaller than 500 μm in diameter. Particles having 425~500 pm diameter were selected and heated at 450° C. in a hydrogen stream for 60 minutes to remove the organic bonding material.

The particles were arranged in a mono-layer with the most close-packed in a one-axis compacting die, and compacted into a plate compact of 22 mm diameter and 135 μm thickness under the pressure of 2000 kgf/cm$^2$ (196 MPa). A 58 wt. % Fe-42 wt. % Ni alloy plate having 22 mm diameter and 100 μm thickness and a graphite plate of 22 mm diameter and 400 μm thickness were prepared. These plates were combined in the order of (Fe-Ni alloy plate)/(plate compact)/(Fe-Ni alloy plate)/(graphite plate) as shown in FIG. 5B. The plate combination was exposed to the same conditions as Example 1 to synthesize diamond in that the multilayer plates were composed of: (a) 20 compact plates, (b) 40 Fe-Ni alloy plates, and (c) 21 graphite plates. The amount of yielded diamond was 3.6 grams, 2.4 grams out of this 3.6 grams had a size of 40/50 mesh, and 2.0 grams out of this 2.4 grams were high strength diamond particles.

EXAMPLE 6

Single crystal diamond particles having the size of 325/400 mesh were coated by the same apparatus and in the same manner as described in Example 1. In this Example, the composition of the slurry was (graphite):(Fe-Ni alloy):(wax):(ethanol)=30:70:3:100 (weight ratio). After the particles were coated, aiming at 2 mm diameter, particles having 1.7~2.4 mm diameter were selected and heated at 550° C. in a hydrogen stream for 60 minutes to remove the organic bonding material. The particles were then compacted into a circular column compact under the pressure of 3000 kgf/cm$^2$ (294 MPa) applying the case as shown in FIG. 9A to the apparatus of FIG. 8A. The compact was heated at 1100° C. in hydrogen for 60 minutes, and then worked as described in Example 1. The apparent density of the compact was 86%, of the theoretical density. The compact was exposed under the conditions described in Example 1, but the keeping time was 60 minutes to synthesize diamond. The amount of yielded diamond particles was 6.0 grams, 3.4 grams out of this 6.0 grams were a size of 20/25 mesh, and 1.9 grams out of this 3.4 grams were high strength particles.

EXAMPLE 7

Single crystal diamond particles having a 20~30 μm diameter were coated by the same apparatus and in the same manner as described in Example 1. In this Example, the composition of the slurry was Fe:Ni:(acrylic copolymer):(isopropanol)=70:30:3:70 (weight ratio), and drying air was 70° C. After the particles were coated, aiming at 50 μm in diameter, the particles having 44~63 μm in diameter were selected. These particles were further coated by the same apparatus and in the same manner as described in Example 1. The composition of the slurry was (graphite):(Fe-Ni alloy):(acrylic copolymer):(maleic anhydride ester):(isopropanol)=25:75:5:6.5:95 (weight ratio).

After the particles were coated aiming at 800 μm in diameter, the particles having 710~840 μm in diameter were selected and heated at 600° C. in a mixed gas of 10 vol % hydrogen and 90 vol % nitrogen for 30 minutes to remove the organic bonding material. These particles were molded into a circular column compact under the pressure of 2500 kgf/cm$^2$ (245 MPa) in the same manner as Example 6. The compact was heated at 1100° C. in 100 torr of reduced pressure of hydrogen for 60 minutes, and then worked as described in Example 1. The apparent density of the compact was 83% of the theoretical density. Diamond particles were synthesized as described in Example 1. The amount of yielded diamond particles was 7.2 grams, 4.9 grams of which were a size of 40/50 mesh, and 3.9 grams out of this 4.9 grams were high strength diamond particles. The inclusions around the seed crystals were remarkably reduced as compared with Example 1.

EXAMPLE 8

Single crystal diamond particles that were plated with Cu in 50 weight percent and had 22~36 μm in diameter were coated by the same apparatus and in the same manner as described in Example 1. In this Example, the composition of the slurry was Fe:Ni:(acrylic copolymer):(maleic anhydride ester):(isopropanol)=70:30:1:2.5:70 (weight ratio), and the drying air was at 70° C.

After the particles were coated, aiming at 50 μm in diameter, the particles having 44~63 μm in diameter were selected. These particles were further coated by the same apparatus and in the same manner as described in Example 1. The composition of the slurry was (Fe-Ni alloy):(acrylic copolymer):(maleic anhydride ester):(isopropanol)=100:1:2.5:70 (weight ratio).

After the particles were coated, aiming at 200 μm in diameter, the particles having 180~210 μm in diameter were selected. These particles were further coated by the same apparatus and in the same manner as described in Example 1. The composition of the slurry was (graphite):(Fe-Ni alloy)-(acrylic copolymer):(maleic anhydride ester):(isopropanol)=25:75:2:5:95 (weight ratio).

After the particles were coated, aiming at 800 μm in diameter, the particles having 180~210 μm in diameter were selected. The following steps, including removing the organic bonding material, compacting, heat treating, working, and synthesizing diamond, were carried out as described in Example 6. The amount of yielded diamond particles was 7.5 grams, 5.1 grams out of this 7.5 grams were a size of 40/50 mesh, and 4.4 grams out of this 5.1 grams were high strength diamond particles. The inclusions around the seed crystals were remarkably reduced and appeared to be reduced beyond the level found in Example 7.

EXAMPLE 9

Single crystal diamond particles that were plated with Ni in 56 weight percent and had 30~40 μm in diameter were coated by the same apparatus and in the same manner as described in Example 2. In this Example: (1) the slurry of (solvent metal)/(organic bonding material) was sprayed in the direction of a tangential line to the outer cylinder of the coating equipment, (2) the composition of the slurry was Fe:Ni:(acrylic copolymer):(isopropanol)=70:30:3:70 (weight ratio), and (3) the drying air was at the temperature of 60° C.

After the particles were coated aiming at 50 μm in diameter, the particles having 44~63 μm in diameter were selected. These particles were further coated by the same apparatus and in the same manner as described in Example 2. The composition of the slurry was Fe:Ni:(graphite):(acrylic copolymer):(isopropanol)=49:21:30:3:70 (weight ratio).

After the particles were coated, aiming at 800 μm in diameter, the particles having 710~840 μm in diameter were selected. The following steps, including removing the organic bonding material, compacting, heat treating, working, and synthesizing diamond, were carried out as described in Example 6. The amount of yielded diamond particles was 7.5 grams, 4.9 grams of which were a size of 40/50 mesh, and 4.1 grams out of this 4.9 grams were high strength diamond particles. The inclusions around the seed crystals appeared to be the same extent as Example 8.

It is explained in each Example that the amount of yielded diamond particles were A grams, B grams out of this A grams of particles have a size of C, and D grams out of this B grams were high strength diamond particles. The estimation was based on the pot-mill method, which is widely used in the diamond tool field.

Figure 14:
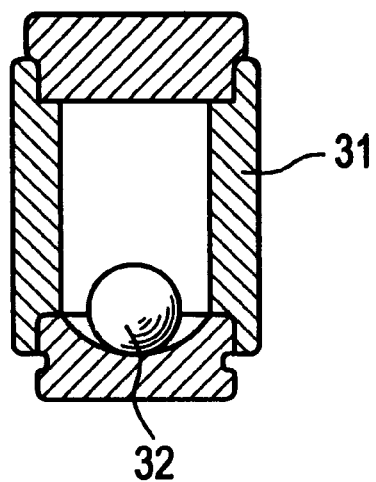
FIG. 14 shows a schematic cross section of a steel capsule for measuring impact strength.

The method is explained hereafter on the assumption that the object of producing diamond particles is to obtain a size of 40/50 mesh, and approximately the same size of diamond particles are manufactured. The amount of A grams of manufactured diamond particles are sieved, and B grams of a size of 40/50 mesh are obtained. Examples 1, 3, 5, 7, 8, and 9 correspond to this assumption. The following amount of diamond particles out of the B grams in each example are put into the steel capsule (31) for measuring impact strength as shown in FIG. 14, and shaken with a steel ball (32) under the following conditions:

inner volume of the capsule: about 2.5 CC diameter of steel ball: 5/16 inch number of steel ball: 1 revolutions of steel capsule: 2400 rpm amplitude of vibration: about 8 mm shaking time about: 50 seconds amount of diamond: 2 ct (0.4 g)

The shaken diamond particles are removed from the capsule and sieved by estimation sieve of 302 μm. Weight percent of the amount under the estimation sieve is the crushed ratio, and this percent is called "crushability." On the other hand, the weight percent of the amount over the estimation sieve is called "strength" or "toughness." The strength of each above example is shown in Table 1 and is stronger than the comparative Examples, which are obtained on the market. The meaning of "after heat treatment" is that the value is measured at room temperature after heat treatment of 1100° C.×30 minutes in vacuum.

TABLE 1

| | Particle Diameter | Estimation Sieve | Toughness (%) | |
| --- | --- | --- | --- | --- |
| | | | No Heat Treatment | After Heat Treatment |
| Example 1 | #40/50 (300~425 μm) | 302 μm | 84 | 79 |
| Example 3 | #40/50 (300~425 μm) | 302 μm | 81 | 78 |
| Example 5 | #40/50 (300~425 μm) | 302 μm | 82 | 77 |
| Example 7 | #40/50 (300~425 μm) | 302 μm | 84 | 82 |
| Example 8 | #40/50 (300~425 μm) | 302 μm | 85 | 84 |
| Example 9 | #40/50 (300~425 μm) | 302 μm | 84 | 81 |
| Comparative Example 1 | #40/50 Popular Grade on Market | 302 μm | 70–75 | 60–70 |
| Comparative Example 2 | #40/50 High Grade on Market | 302 μm | 75–80 | 70–77 |
| Comparative Example 3 | #40/50 Highest Grade on Market | 302 μm | 85 | 83 |

What we claim:

1. A process for synthesizing diamond comprising: coating diamond seed particles with at least one layer which contains at least one solvent metal powder for synthesizing diamond and/or at least one solvent metal powder with an organic bonding material, wherein the coating is carried out using a Wurster fluidized bed apparatus or a horizontally rotating disk device, to thereby produce coated diamond seed particles; filling a mold with said coated diamond seed particles; compacting the coated diamond seed particles in the mold to form a compact; arranging the compact in a diamond synthesizing vessel; heating said compact to a temperature above a solvent metal-graphite melting point at a pressure at which diamond is thermodynamically stable, to thereby produce diamond abrasive particles; and recovering said diamond abrasive particles.

2. A process according to claim 1, wherein said layer contains non-diamond carbon.

3. A process according to claim 1, wherein said layer includes said organic bonding material, and said organic bonding material contains an acrylic copolymer.

4. A process according to claim 1, wherein said coating includes spraying the solvent metal powder into a cylinder containing the rotating disk.

5. A process according to claim 1, wherein said coated diamond seed particles are further coated with a mixture containing at least one material selected from a second solvent metal powder, a non-diamond carbon material, an organic bonding material, and an organic solvent.

6. A process according to claim 1, wherein the layer contains an organic bonding material, and wherein, prior to compacting said coated diamond seed particles are heated at about 300~600° C. to remove the organic bonding material.

7. A process according to claim 6, wherein the heating prior to compacting is carried out in a reducing atmosphere or in an inert atmosphere.

8. A process according to claim 1, wherein the layer contains an organic bonding material, and said compact is heated to about 300~600° C. to remove the organic bonding material.

9. A process according to claim 1, wherein the heating is carried out in a reducing atmosphere or in an inert atmosphere.

10. A process according to claim 9, wherein said compacting is carried out using a wet-cold isostatic press or a dry-cold-isostatic press.

11. A process according to claim 1, wherein said compacting is carried out using a cold-isostatic press.

12. A process according to claim 1, wherein said compact is a single layer of coated diamond seed particles.

13. A process according to claim 1, wherein said compact is a stack including a non-diamond carbon plate and a solvent metal plate.

* * * * *